United States Patent Office 2,925,617
Patented Feb. 23, 1960

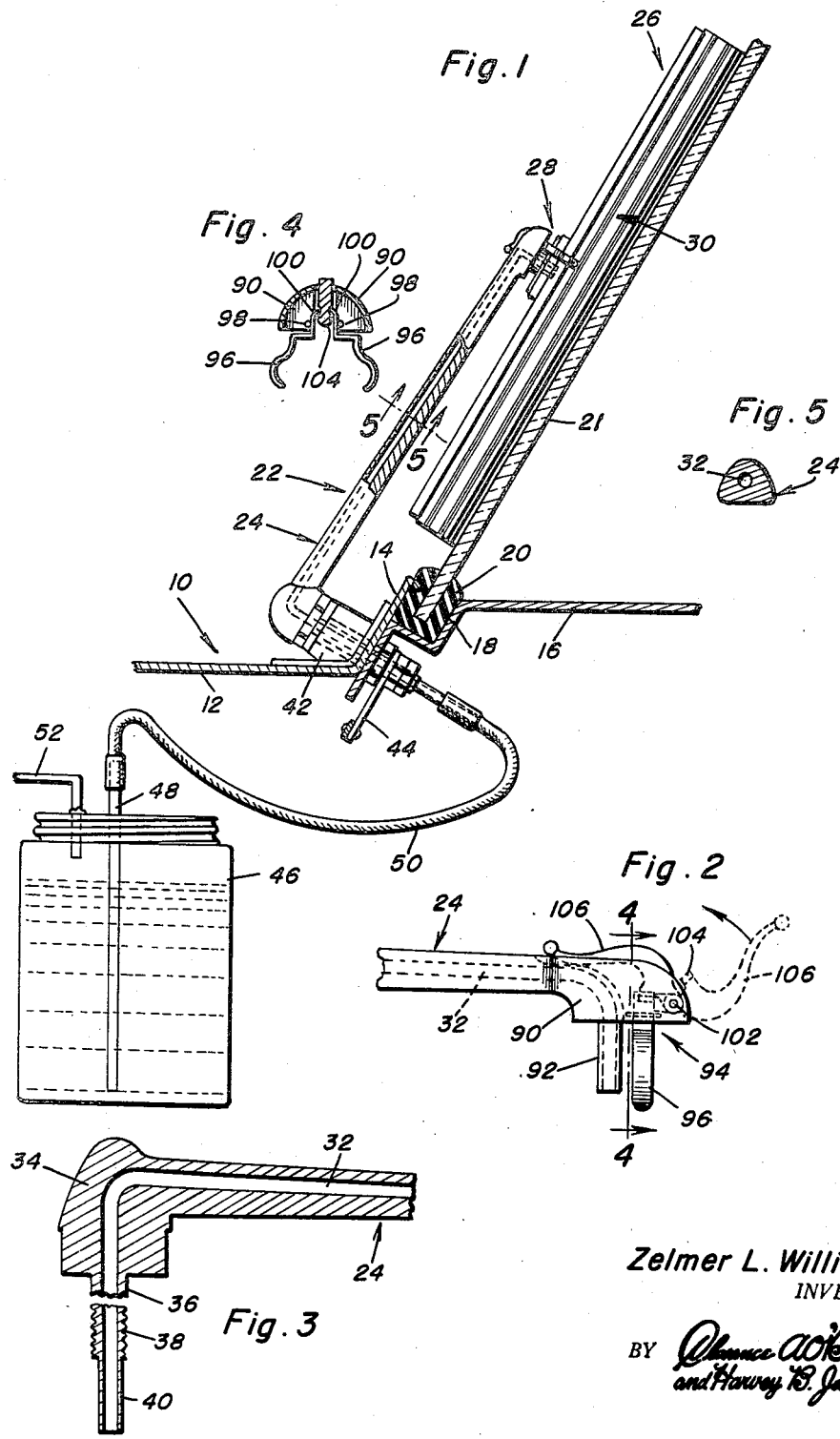

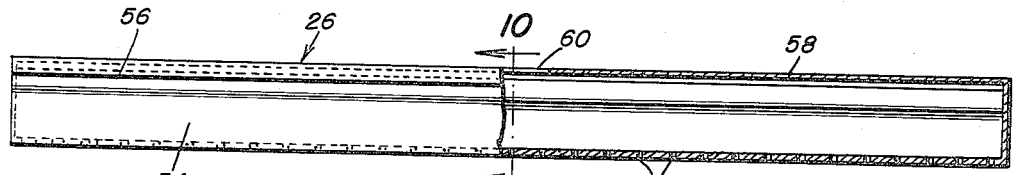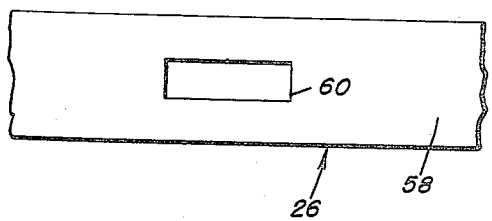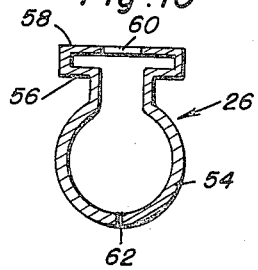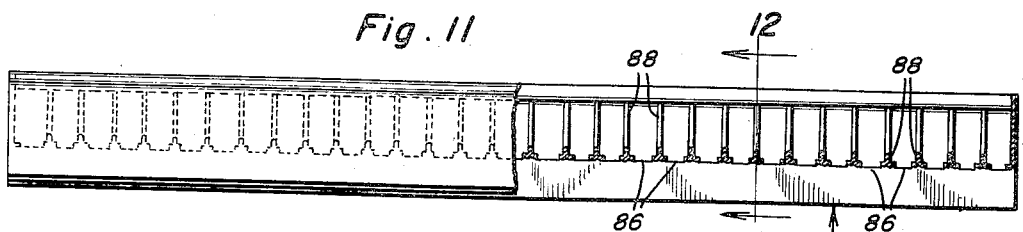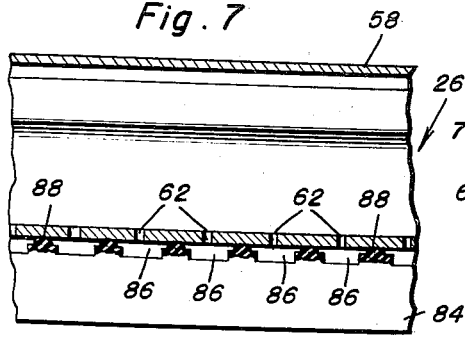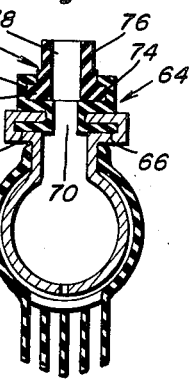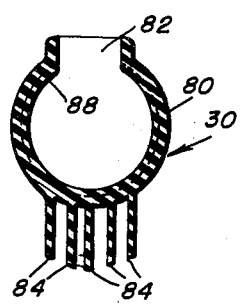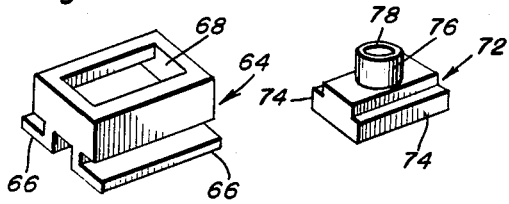

2,925,617

WINDSHIELD WIPER

Zelmer L. Williams, Port Angeles, Wash., assignor to Williams Automotive Products Corporation, a corporation of Washington Application November 16, 1956, Serial No. 622,692

1 Claim. (Cl. 15—250.4)

This invention relates in general to new and useful improvements in vehicle accessories and more specifically to an improved windshield wiper assembly.

For a vehicle a windshield wiper serves a dual function. When it is raining quite hard, the windshield wiper tends to reduce the coating of water on the windshield to a minimum to permit clear vision. Also, when it is only raining lightly the windshield wiper serves to remove the dirty water from the windshield and thus effect a cleaning operation. However, after the rain has stopped or during a very light drizzle preceding automobiles will throw up sufficient road water onto the windshield to obscure the vision of a driver of a vehicle and at the same time the moisture on the windshield is insufficient for the wiper to effect a proper cleaning operation. In order to overcome this situation, there have been devised windshield washers. However, these washers normally spray a direct stream of water on the windshield after which the wipers are used to clean the windshield. However, the sprays of water are not too well directed and as a result, a large percentage of the water is actually wasted.

It is therefore the primary object of this invention to provide an improved windshield wiper assembly which includes a built-in water supply, the water being applied to the windshield directly through the wiper blade so as to prevent the unnecessary wasting of the water or other cleaning fluid by distribution thereof to other parts of the vehicle than that actually engaged by the wiper blades.

Another object of this invention is to provide an improved windshield wiper assembly of the type which is provided with self-contained cleaning fluid supplying means, the wiper assembly including a blade support bar which is hollow and which forms a distributor, there being removably carried by the wiper support bar a special wiper blade which receives water from the blade support bar and distributes such water to a windshield while cleaning the windshield.

A further object of this invention is to provide a novel connection between a wiper arm, a blade support bar and a wiper blade of a windshield wiper assembly of the type which supplies water to a windshield for the purpose of cleaning the windshield while the wiper is operating, the connection being of such a nature whereby the entire wiper assembly may be readily disassembled for inspection, cleaning and repair and the parts readily reassembled with a tight seal between all of the parts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view taken through a windshield portion of the vehicle body and shows mounted on the vehicle the wiper assembly which is the subject of this invention, a portion of the wiper arm being broken away and shown in section in order to clearly illustrate the details of a conduit therethrough, the wiper arm being schematically illustrated as being connected to a source of water or other windshield cleaning fluids;

Figure 2 is a rotated fragmentary enlarged elevational view of the upper end of the wiper arm and shows the details of the means for attaching the wiper arm to the blade support bar, a cam actuator for clamp means of the wiper arm being shown in an inoperative position by dotted lines;

Figure 3 is a rotated enlarged sectional view taken through the lower end of the wiper arm and shows the general details thereof, an intermediate portion of a connecting part of the wiper arm being broken away;

Figure 4 is an enlarged transverse sectional view taken substantially upon the plane indicated by the section line 4—4 of Figure 2 and shows the relationship between the cam actuator of the clamp assembly and clamp arms thereof;

Figure 5 is an enlarged fragmentary sectional view taken substantially upon the plane indicated by the section line 5—5 of Figure 1 and shows the general cross-section of the wiper arm;

Figure 6 is an enlarged fragmentary sectional view taken through the central portion of the blade support bar and wiper blade as they would appear removed from the wiper arm and shows the specific details of the coupling components thereof;

Figure 7 is an enlarged fragmentary longitudinal sectional view taken through the blade support arm and wiper blade and shows the relationship between the two including fluid outlets thereof;

Figure 8 is a rotated enlarged elevational view of the blade support arm with a portion thereof being broken away and shown in section to illustrate the details thereof;

Figure 9 is an enlarged fragmentary view of the central portion of the blade support bar and shows the opening therein for receiving coupling blocks;

Figure 10 is an enlarged fragmentary transverse sectional view taken substantially upon a plane indicated by the section line 10—10 of Figure 8 and shows the cross section of the blade support bar;

Figure 11 is a rotated elevational view on an enlarged scale of the wiper blade with portions thereof being broken away and shown in section to illustrate the internal construction thereof;

Figure 12 is an enlarged transverse sectional view taken through the wiper blade on the section line 12—12 of Figure 11 and shows further details of the construction of the wiper blade;

Figure 13 is an enlarged perspective view of a first coupling block carried by the blade support bar; and Figure 14 is an enlarged perspective view of a second coupling block which is carried by the first coupling block.

Referring now to the drawings in detail, it will be seen that there is illustrated in Figure 1 a portion of a vehicle body which is referred to in general by the reference numeral 10. The vehicle body 10 includes a cowl portion 12 which has an upwardly directed rear part 14. Connected to the cowl portion 12 is the forward part of an instrument panel 16 the upper part 14 of the cowl portion 12 cooperating with the instrument panel 16 to form a socket 18 receiving a gasket 20 for a windshield 21. Removably carried by the cowl portion 12 is a windshield wiper assembly which is the subject of this invention, the assembly being referred to in general by the reference numeral 22.

The windshield wiper assembly 22 includes a wiper arm, which is referred to in general by the reference numeral 24, a blade support bar, which is referred to in general by the reference numeral 26, coupling means 28 connecting the blade support bar 26 to the wiper arm 24 for removal therefrom, and a wiper blade which is referred to in general by the reference numeral 30.

As is best illustrated in Figures 3 and 5, the wiper arm 24 is generally triangular in cross section and is provided with a fluid conduit 32 therethrough. Further, the lower end of the wiper arm 24 includes an enlargement 34 which has extending rearwardly therefrom a tubular connecting portion 36. The tubular connecting portion 36 includes an intermediate externally threaded part 38 and a reduced rear part 40.

Referring now to Figure 1, it will be seen that the wiper arm 24 is secured to the vehicle body 10 by means of a normal wiper arm support head 42 and that there is connected to the wiper arm 24 a lever 44 for effecting oscillatory movement of the wiper arm 24.

The vehicle 10 will be provided with a windshield cleaning fluid container 46 in which there may be disposed a suitable cleaning fluid, including water. The container 46 is provided with a discharge pipe 48 which has connected thereto a flexible conduit 50. The opposite end of the flexible conduit 50 is telescoped over the reduced rear portion 40. A control line 52 is connected to the container 46 for controlling the flow of cleaning fluid therefrom.

Referring now to Figure 10 in particular, it will be seen that the blade support bar 26 includes a longitudinal bulbous lower part 54 and a longitudinal internally grooved T-shaped upper part 56. The blade support bar 26 is of a hollow construction and includes a top wall 58 having a central elongated rectangular opening 60 in the T-shaped upper part. The bulbous lower portion 54 is provided opposite said upper part 56 with longitudinally spaced fluid outlets 62.

Referring now to Figures 6 and 13 in particular, it will be seen that there is seated in the opening 60 a resilient first connecting block 64. The connecting block 64 is provided at its lower end with outturned flanges 66 which pass down through the opening 60 and engage beneath the top wall 58 within the internally grooved upper T-shaped part 56. The connecting block 64 is also provided with an internally flanged socket in the upper part thereof. The socket is referred to by the reference numeral 68 and is communicated with an opening 70 passing entirely through the connecting block 64.

It is pointed out at this time that the connecting block 64 is formed of a molded rubber product so as to effect the coupling thereof with the blade support bar 26.

The coupling means 28 also includes a second resilient connecting or coupling block 72. The coupling block 72 includes outwardly projecting flange portions 74 which are seated in the socket 68 of the connecting block 64 to interlock therewith in the manner best illustrated in Figure 6. The coupling block 72 also includes an upwardly projecting socket forming part 76 having a bore 78 therethrough. As is illustrated in Figure 6, the bore 78 passes entirely through the coupling block 72 and is aligned with the opening 70. Like the connecting block 64, the coupling block 72 is also formed of a molded rubber product to facilitate the connection thereof with the connecting block 64.

As is best illustrated in Figures 7, 11 and 12, the wiper blade 30 is formed of a rubber product and includes an elongated tubular upper portion 80 which has an elongated tubular upper portion 80 which has an elongated upper part 82. The open part 82 receives the bulbous lower portion 54 of the blade supporting bar 26 and the bulbous lower portion 54 is received in the sleeve 80. Depending from the sleeve 80 is a plurality of longitudinally extending, transverse spaced wiper blade elements 84. The bottom part of the sleeve portion 80 is provided with a plurality of longitudinally spaced openings 86 which are aligned with the outlet openings 62 of the blade support bar 26 for distributing a cleaning fluid to the wiper blade elements 84.

It is to be noted that the sleeve portion 80 of the wiper blade 30 is reinforced by a plurality of internal ribs 88. The ribs 88 are longitudinally spaced and are disposed intermediate the outlet opening 86. It is to be noted that the ribs 88 tightly engage the bulbous portion 54 of the blade support bar 26 and forms a seal therewith intermediate the outlet openings 62 of the blade support bar 26.

The coupling means 28 also includes an enlarged head 90 on the upper end of the wiper arm 24. This enlarged head carries a spigot portion 92 of a size to be snugly received in the bore 78 of the socket part 76. The spigot portion 92 is communicated with the conduit 32.

The coupling means 28 also includes a clamp assembly 94 for clamping the blade support bar 26 to the wiper arm 24. The clamp assembly 94 is carried by the enlarged head 90 and includes a pair of clamp members 96 which are pivotally mounted on the head 90 for rocking movement by a pair of longitudinally extending pins 98. This is best illustrated in Figure 4. The clamp members 96 have upper portions 100 disposed above the pins 98.

Pivotally carried by the head 90 and mounted on a transverse pivot pin 102 is a clamp actuating cam 104. The cam 104 is provided with a suitable handle 106 for moving the cam 104 into a clamp actuating position. As is best illustrated in Figure 4, when the cam 104 passes down between the upper parts 100 of the clamp members 96, the lower parts of the clamp members 96 are urged together. When the T-shaped upper portion 56 of the blade support bar 26 is disposed between the clamp members 96, then the blade support bar 26 will be securely clamped to the wiper arm 24.

It is to be understood that during the normal operation of the wiper assembly 32, the wiper blade 30 will function in the same manner as any other wiper blade. However, when it is desired to clean the windshield 22, control means (not shown) for the fluid container 46 will be actuated so as to force cleaning fluid from the fluid container 46 to the conduit 50 and into the wiper arm 24. The fluid will then pass through the coupling means 28 into the blade support bar 26 and exit through the wiper blade 30 between the blade elements thereof. Inasmuch as the cleaning fluid will be distributed only to that area of the windshield which is engaged by the wiper blade 30, it will be readily apparent that there will be no loss of the cleaning fluid and that the usual streaks which occur from the cleaning fluid being spread over a windshield indiscriminately will no longer result. Further, because of the saving of the cleaning fluid, it will be necessary to replenish the contents of the container 46 at less frequent intervals. It is to be understood that the details of the wiper assembly 22 are such that they may be mounted on a vehicle in lieu of the conventional wiper assembly without any changes whatsoever in the mounting head 42 or the lever 44. It is merely necessary to remove the original wiper assembly and to replace it with the wiper assembly 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a windshield wiper assembly, an elongated hollow bar having an upper longitudinal part of T-shape cross-section and a lower longitudinal part on said upper part of bulbous cross-section, said upper part being provided with a top fluid inlet opening therein of rectangular shape, and said lower part being provided with a bottom row of fluid discharge openings therein, said upper part being provided with a pair of longitudinal internal grooves therein at opposite sides of said inlet opening, a wiper blade comprising an elongated longitudinally split resilient tube conformably and frictionally fitting over said lower longitudinal part of said bar and having a plurality of laterally spaced bottom wiper fins depending therefrom longitudinally thereof and longitudinally spaced liquid discharge openings in its bottom communicating with the spaces between said fins, and means for attaching said bar to and in communication with a spigot on a wiper arm comprising a bored resilient block structure of interfitting relatively detachable opposed sections one of which is rectangular and fits in the rectangular top opening of said upper part and interlocks with the grooves in said upper part.

References Cited in the file of this patent

UNITED STATES PATENTS

| | | |
|---|---|---|
| 816,924 | Lattin | Apr. 3, 1906 |
| 1,857,419 | Williams | May 10, 1932 |
| 1,947,803 | Sandman | Feb. 20, 1934 |
| 2,582,717 | Pierce | Jan. 15, 1952 |
| 2,639,455 | Schwarzmann | May 26, 1953 |
| 2,648,865 | Gordon et al. | Aug. 18, 1953 |